United States Patent [19]

Kim et al.

[11] Patent Number: 5,487,795
[45] Date of Patent: Jan. 30, 1996

[54] METHOD FOR HEAT TREATING AN IMPACT BEAM OF AUTOMOTIVE VEHICLE DOOR AND A SYSTEM OF THE SAME

[75] Inventors: Jong-Kyu Kim; Jin-Suk Lee, both of Kyungbuk, Rep. of Korea

[73] Assignee: Dong Won Metal Ind. Co., Ltd., Rep. of Korea

[21] Appl. No.: 269,483

[22] Filed: Jul. 1, 1994

[30] Foreign Application Priority Data

Jul. 2, 1993 [KR] Rep. of Korea ............... 93-12358
Apr. 27, 1994 [KR] Rep. of Korea ............... 94-8904

[51] Int. Cl.$^6$ ........................... C21D 9/00
[52] U.S. Cl. ............ 148/520; 148/909; 219/656; 219/662; 219/671
[58] Field of Search ............. 148/520, 909; 219/643, 656, 662, 671

[56] References Cited

U.S. PATENT DOCUMENTS

| | | | |
|---|---|---|---|
| 4,093,839 | 6/1979 | Moliterno et al. | 219/656 |
| 4,740,255 | 4/1988 | Manton | 148/334 |
| 4,796,946 | 1/1989 | Wilson et al. | 148/333 |
| 5,181,974 | 1/1993 | Tanabe et al. | 148/320 |
| 5,192,376 | 3/1993 | Tanabe et al. | 158/520 |

FOREIGN PATENT DOCUMENTS 92-529  1/1992  Rep. of Korea .

OTHER PUBLICATIONS

Japanese Unexamined Patent Publication No. 4–52254 dated Feb. 20, 1992 entitled "A Method for Making for Making a Quenched Steel Tube for Reinforcement of an Automotive Vehicle Door".

*Primary Examiner*—Stanley S. Silverman
*Assistant Examiner*—Sikyin Ip
*Attorney, Agent, or Firm*—Blakely, Sokoloff, Taylor & Zafman

[57] ABSTRACT

A method and a system for heat treating an impact beam of an automotive vehicle door. Hot rolled steel sheets are prepared having a composition consisting essentially of 0.18% to 0.22% carbon; 1.0 to 1.5% manganese; 0.15 to 0.4% silicon; not more than 0.025% phosphorous; not more than 0.008% nitrogen; not more than 0.0010% sulfur; 0.01 to 0.04 aluminum; 0.001 to 0.003% boron; 0.1 to 0.3% chromium; 0.01 to 0.035% titanium; and the balance essentially iron, roll-forming and welding the steel sheets to make a tube-shaped impact beam. The heat treatment is carried out by high frequency induction heating and air cooling the impact beam, and water cooling the heat treated and air cooled impact beam.

2 Claims, 5 Drawing Sheets

METHOD FOR HEAT TREATING AN IMPACT BEAM OF AUTOMOTIVE VEHICLE DOOR AND A SYSTEM OF THE SAME

BACKGROUND OF THE INVENTION (1) Field of the Invention

The present invention relates to a method for heat-treating a tube-shaped impact beam for reinforcing an automotive vehicle door to ensure the safety of a driver and a passenger in side collision and a system therefor. More particularly, it relates to a heat treatment of an impact beam mounted inside an automotive vehicle door and capable of meeting stringent mechanical property requirements such as tensile strength, yield strength and elongation without adding excessive weight to the vehicle.

(2) Description of the Prior Art

Competitively, automobile companies today in the world are typically to provide metal reinforcement to the inside of a panel of an automotive vehicle door in order to ensure the safety of the vehicle.

The reinforcement of the automotive vehicle door should have high strength, ductility and toughness without bending or being breaking against any impact to adversely affect a passenger's body. The mechanical characteristics and manufacturing processes should be designed and raw materials therefor be selected in order that the reinforcement is produced and supplied to the vehicle with minimum expense.

Since there may be a local buckling phenomenon according to a wall thickness-to-outer diameter ratio, the t/D ratio of the impact beam in a case that loads more than a predetermined [size] force is applied to the beam, what is important in such an impact beam, is defining the size range of materials that this phenomenon occurs or selecting a steel having a strength enough to meet mechanical property requirements required for use in the automobile industry.

For example, if a span L of a bending load applied to the steel tube is 800 mm, local buckling occurs in the range of t/D≦8.5%. Therefore, if the outer diameter D is 31.8 mm, the thickness t should be more than 2.7 mm.

The increase in the thickness may prevent the local buckling of the beam but increases in the vehicle weight. Therefore, it is necessary to enhance mechanical properties to minimize the required thickness.

The automobile companies in the many countries have regulated prevailing mechanical properties of an impact beam to have a minimum tensile strength of about 110 kg/mm$^2$ a minimum yield strength of about 80 kg/mm$^2$ and a minimum elongation of about 10% pass the US Federal Motor Vehicle Safety Standard (FMVSS) regulation No. 214. However, an impact beam having more excellent mechanical properties than the above is required in order to reduce the weight of an automotive vehicle.

Recently, many techniques for manufacturing an impact beam have been described.

Representative conventional techniques are disclosed in the Korean Patent Publication No. 92-529 entitled "A method for making a tubing steel alloy to protect an automotive vehicle door" and in the Japanese Unexamined Patent Publication No. 4-52254 entitled "A method for making a quenched steel tube for reinforcement of an automotive vehicle door".

Another technique is disclosed in the Korean Unexamined Patent Publication No. 93-17645 entitled "A method for making an impact beam of an automobile" published on Sep. 20, 1993.

The above Korean Patent Publication No. 92-529 relates to a method for making a tubing steel alloy, a reinforcement not necessitating heat treatment, and discloses the chemical components of a steel alloy and a technique of hot rolling processing with a final rolling temperature of 980° C. to 1080° C.

The Japanese Unexamined Patent Publication No. 92-52254 relates to a method for making a reinforcing quenched tube of an automobile door having a high tensile strength with carbon steel containing about 0.1 to 0.3% carbon after high frequency induction heating and then water cooling.

This technique may achieve a high strength impact beam but has problems of poor weldability, susceptibility to cracking when roll-forming welding or using at low temperatures because of the relatively high carbon steel , and of mounting such an impact beam on a vehicle.

The Korean Unexamined Patent Publication No. 93-17645 discloses a 2-step heating treatment of firstly heating a welded tube for 5 to 150 seconds at 860° to 950° C., air-cooling the tube for 1 to 6 seconds and water-cooling the tube, and of secondly heating the tube for 5 to 15 minutes at 100° to 250° C. and air-cooling the tube, to achieve an impact beam having an excellent mechanical property of 130 kg/mm$^2$ tensile strength. However, this technique has problems in the performance of systematical and effective heat treatment.

Besides, in line with the remarkable progress in the automotive vehicle industry today, it is necessary to comply with stringent mechanical property requirements, and to provide a more stable heat treatment process and system at minimum expense.

SUMMARY OF THE INVENTION

It is an object of the present invention to provide a method and a system for heat treating an impact beam of an automotive vehicle door having superior mechanical properties in tensile strength, yield strength and elongation. The present invention provides an impact beam of excellent mechanical properties as well as lightweight.

In order to achieve the object, a method for heat treating an impact beam of an automotive vehicle door exhibiting high tensile strength, yield strength and elongation, comprises the steps of:

preparing hot rolled steel sheets having a composition consisting essentially of 0.18 to 0.22% carbon; 1.0 to 1.5% manganese; 0.15 to 0.4% silicon; not more than 0.025% phosphorous; not more than 0.008% nitrogen; not more than 0.0010% sulfur; 0.01 to 0.04 aluminum; 0.001 to 0.003% boron; 0.1 to 0.3% chromium; 0.01 to 0.035% titanium; and the balance essentially iron, roll-forming and welding the steel sheets to make a tube-shaped impact beam;

carrying out a heat treatment including three steps of high frequency induction heating and air cooling the impact beam; and carrying out quenching of water cooling the heat treated and air cooled impact beam.

The heat treatment step includes the steps of:

first high frequency induction heating the impact beam for 0.83 to 2.5 seconds at 500° to 720° C. and air cooling the beam for 0.27 to 1 second;

second high frequency induction heating the impact beam first heat treated for 0.83 to 2.5 seconds at 750° to 850° C. and air cooling said beam for 0.27 to 2 seconds; and third high frequency induction heating the impact beam second heat-treated for 0.83 to 2.5 seconds at 830° to 960° C. and air cooling the beam for 1.5 to 5 seconds.

According to another aspect of this invention, a heat treatment system of an impact beam exhibiting high tensile strength, yield strength and elongation, comprises:

a plurality of transfer rollers for transferring a tubeshaped impact beam;

a heat treatment portion for heating and air cooling the transferred impact beam by the transfer roller, the heat treatment portion including first to third high frequency induction heating devices and first to third air cooling portions serially in order; and a cooling portion disposed in series with the heat treatment portion for water cooling the heat treated impact beam.

A temperature control portion connected to the heating device which controls a temperature of the first to third high frequency induction heating devices, and the transferring speed of the transfer roller is in a range of 60 mm/sec to 180 mm/sec.

DETAILED DESCRIPTION OF THE PREFERRED EMBODIMENTS

Figure 1:
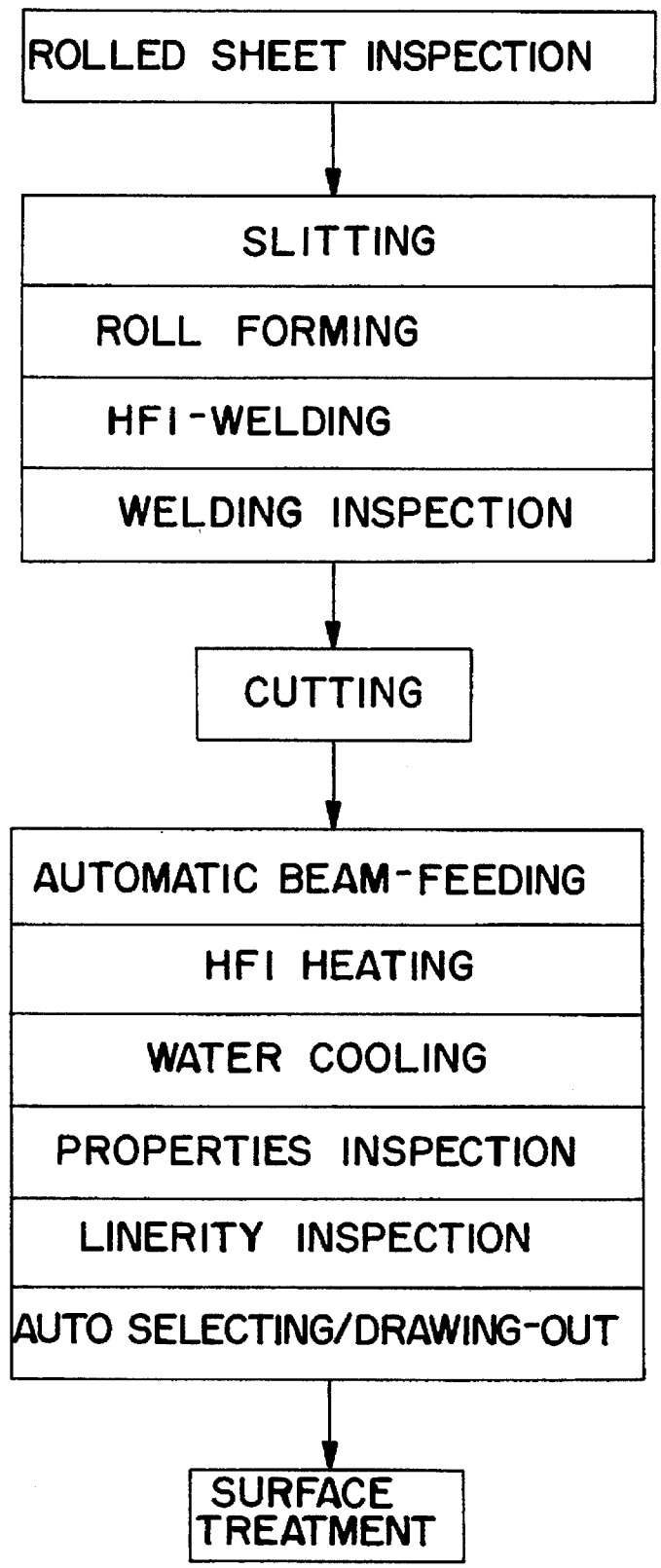
FIG. 1 illustrates the steps in the manufacture of an impact beam of an automotive vehicle door in accordance with the present invention.

The present invention is now described in detail with reference to the accompanying drawings, and the reason of defining the conditions of alloy composition of a hot-rolled steel plate and of heat treatment will be described.

A material for an impact beam should be made at low production cost, and have a high tensile strength by certain heat treatment, ductility, toughness and resistance to cracking at cold temperatures.

Ductility is a term referring to the property of steel not being ruptured and being plastic deformable when an outer stress exceeding the yield strength is applied to the steel. Rupture toughness refers to a resistivity against crack propagation from a sharp notch or crack in steel. These two factors are necessary conditions to prevent damage to the steel in use. The higher the rupture toughness of steel, the poorer its ductility and toughness.

It is necessary to define the appropriate standards in the mechanical properties contrary to each other and the composition of an alloy in the present invention is determined by experimental result.

The real maximum carbon equivalent value of steel sheet used in rolling state is about 0.22%. Carbon is the most effective element to increase the hardening capacity of steel. There is a limit to the amount of carbon of 0.18 to 0.22%, since the disadvantage of carbon lies in decreased ductility and weldability and a bainite or martensite structure may be formed.

Manganese Mn contributes to adjusting and refining impurities such as sulfur or oxygen and improves the hardenability and solid solution strengthening effects in a ferrite phase with an amount of more than 1% present in steel but the Mn content must not be more than 1.5% to prevent welding defects and poor notch toughness.

Silicon Si is important to obtain a sound welded joint and high hardenability and strength and to prevent high-temperature oxidation. Si must be present in an amount of 0.15 to 0.4%.

Aluminum Al has received wide use as a deoxidizer and a regulator of grain growth and contributes to refining grains with a small amount. Thus, Al in a solid phase should be present in an amount of 0.01 to 0.04%.

Boron B does not contribute to the strength of hot rolling steel but remarkably improves the hardenability by quenching and tempering and is added to the present inventive steel in an amount of 0.001% to 0.003%.

Chromium, Cr is a carbide-forming element, and contributes to the strength of ferrite by solid solution strengthening in proportion to the amount present in the ferrite. However, Cr improves weatherproofing and must be present in an amount of 0.1 to 0.3%.

Titanium Ti is a fine alloying element and may contribute to a mechanism known as predipitation hardening. Ti must be present in an amount of 0.01% or more but not more than 0.035% because an excessive amount of Ti stabilizes its carbide and cannot be solidified in austenite before quenching and efforts adversely the hardenability.

Phosphorous remarkably improves solid solution strengthening effect in ferrite but decreases ductility, and there is a limit to the amount of P of not more than 0.025%.

Sulfur S is an impurity and its content is not more than 0.01%.

Nitrogen N is an impurity and its content is not more than 0.008%.

The reason why the high frequency induction heating and air cooling are carried out three times is that the present inventive alloy has a 2-phase structure of ferrite and perlite at a normal temperature.

Perlite is transformed into austenite depending on the ascent of the heating temperature. In such a procedure, scale and decarbonating layers may be generated, which leads to a susceptibility to cracking in the process of quenching. The initial stage of recrystallization forms fine crystalline grains, and after that, rapid crystalline grain growth occurs to decrease the strength and toughness. Heat treatment performed in more than a suitable period of time should be avoided.

The high frequency heating is carried out at a rapid heating speed and a predetermined time is needed to finish the transformation, although the temperature comes up to a transformation point. Since high frequency heating does not give full time to the transformation and the slope of temperature is steep, so the perfect transformation is not carried out, so that there is a problem of existence of residual stress.

The present invention provides heat treatment conditions of repeated heating and air cooling to prevent occurrence of scale and decarbonating layer.

An impact beam is heated in a first high frequency induction heating device within a range of 500° to 720° C. for 0.83 to 2.5 seconds.

This range of temperature includes the nucleation of austenite in the interface of ferrite and perlite and growth to austenite until perlite is dissolved. When this stop is finished, the volume ratio of austenite is the same as that of the initial perlite. This transformation is completed by the heat treatment in 0.83 to 2.5 seconds.

Then, the air cooling is carried out in a first air cooling portion for 0.27 to 1 second, for the purpose of generating a transformed ferrite within a temperature range where austenite is not transformed to perlite and maintaining the volume ratio of the final martensite to improve ductility. Besides, there are not produced scale and decarbonating layers are prevented from forming by rapid heating.

Next, the heating treatment is performed in a second high frequency induction heating device in the range of 750° to 850° C. for 0.83 to 2.5 seconds. In this range of temperature austenite is grown to ferrite to form a partial balance of austenite grown in the first step with ferrite.

The air cooling is performed in a second air cooling portion for 0.27 to 1 second. According to this cooling technique, slow cooling is carried out up to a temperature in which perlite transformation does not occur and there is a room for producing a transformed ferrite. This contributes to the decrease of the strength and the increase of the ductility, and prevents occurrence of a scale and decarbonating layer.

Subsequently, the heating treatment is carried out in a third high frequency induction heating device in the range of 830° to 960° C. for 0.83 to 2.5 seconds. In this range of temperature, the austenite that attains a partial balance in the second step increases very slowly to achieve the final balance with ferrite.

The air cooling is performed in a third air cooling portion for 1.5 to 5 seconds. If the quenching is performed after high frequency heating treatment, there is a probability of cracking. Therefore, it is preferable that tempering is carried out after quenching, but the air-cooling of 1.5 to 5 seconds and quenching may prevent cracking and tempering problems.

The perlite transformation is carried out after five seconds, and there is no room for producing transformed ferrite for not more than 1.5 seconds. Water cooling is performed in a quenching portion to transform austenite to martensite.

A first preferred embodiment of the present invention a heat treatment device is now described.

Figure 2:
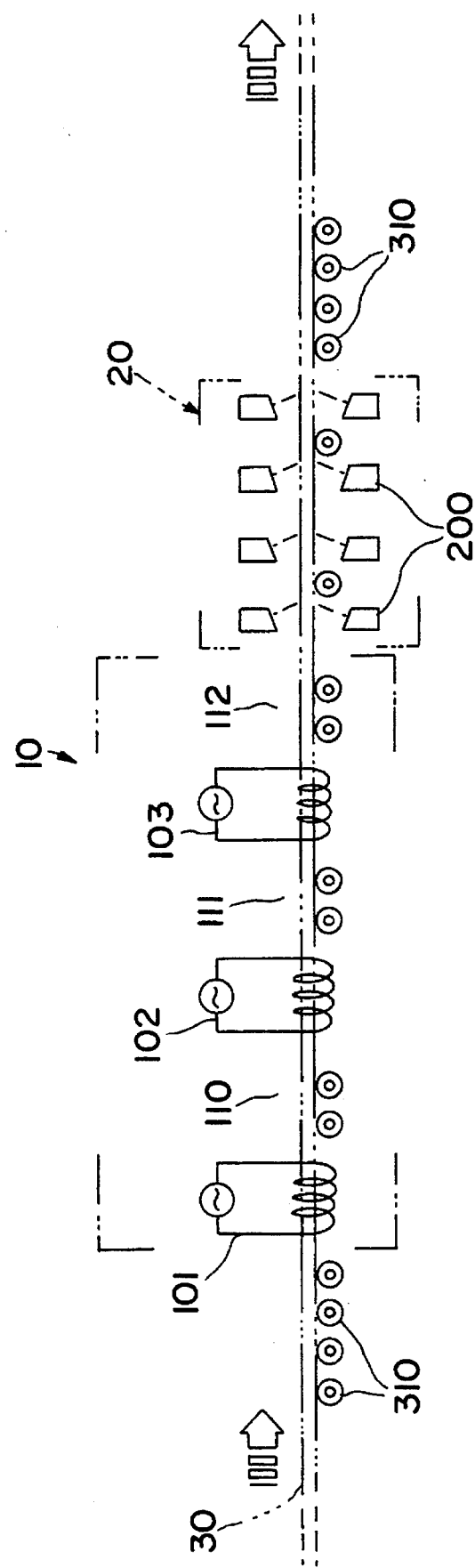
FIG. 2 is a schematical examplary view of a heat treatment device of an impact beam in accordance with the present invention.
Figure 3:
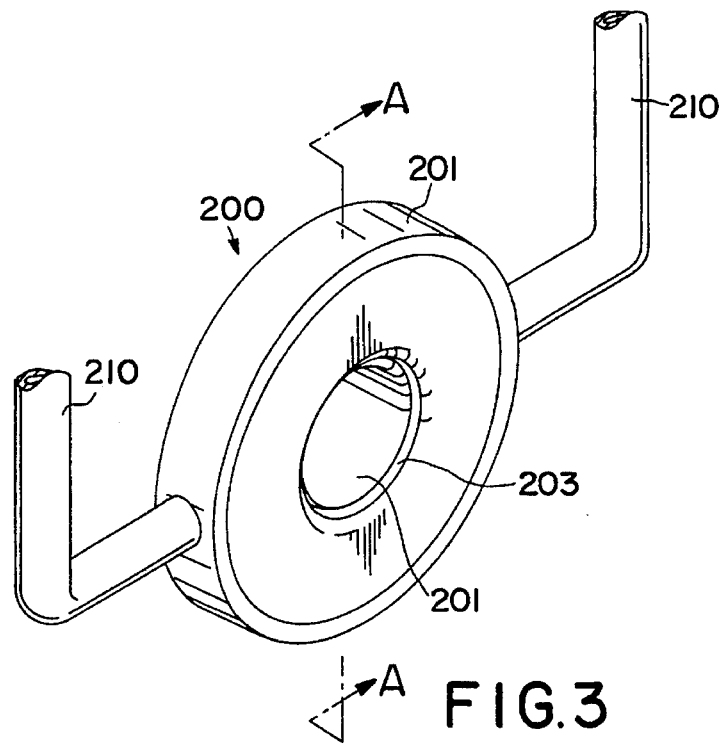
FIG. 3 is an enlarged perspective view of a ring-shaped nozzle water cooling tube in accordance with the present invention.
Figure 4:
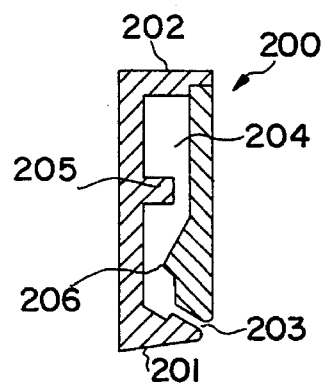
FIG. 4 is an enlarged sectional view taken along line A—A of FIG. 3.
Figure 4:
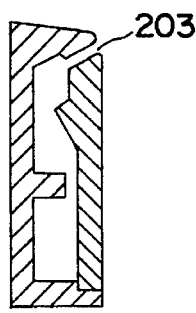
Figure 5:
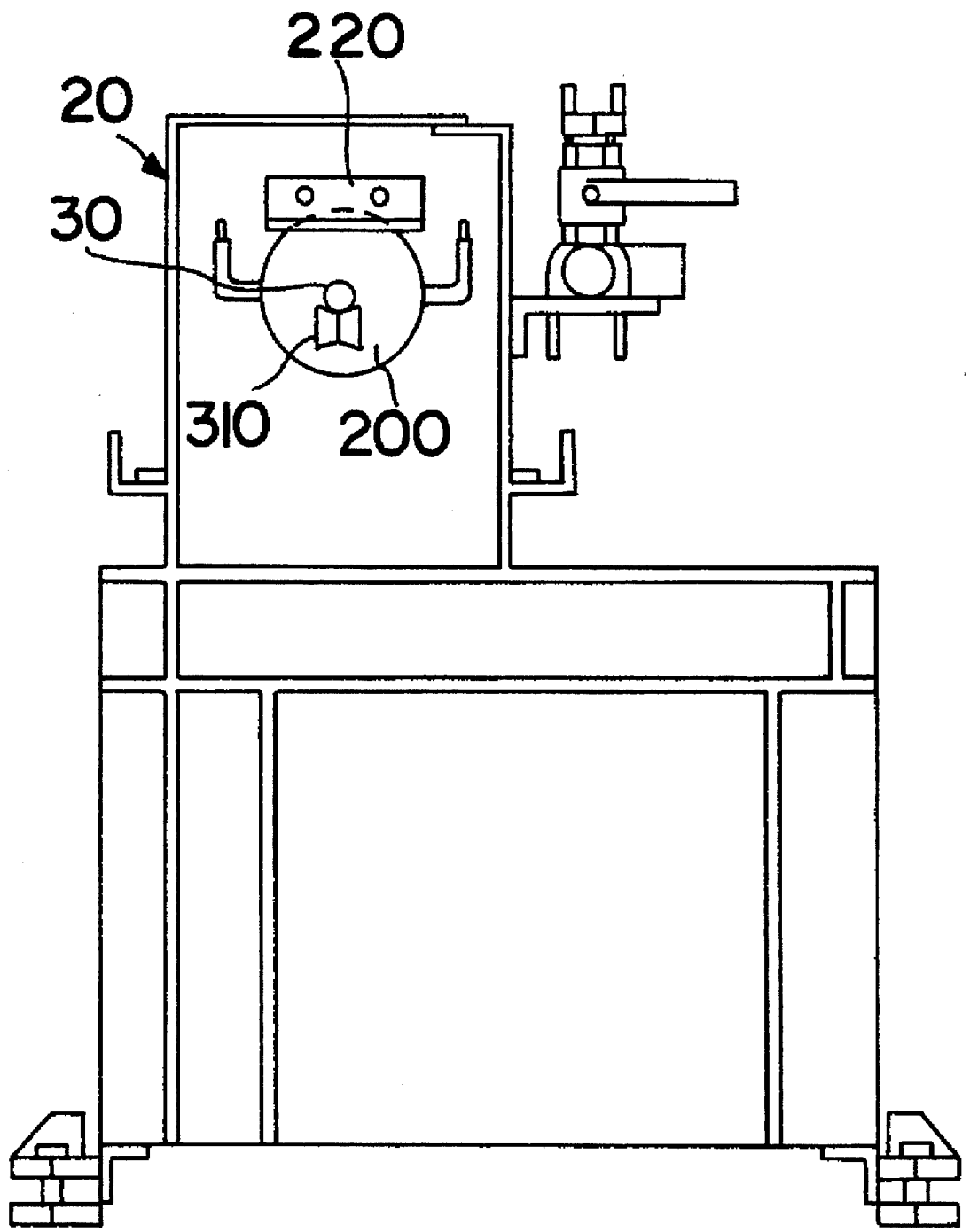
FIG. 5 is an one-side examplary view of a cooling portion in accordance with the present invention.
Figure 6:
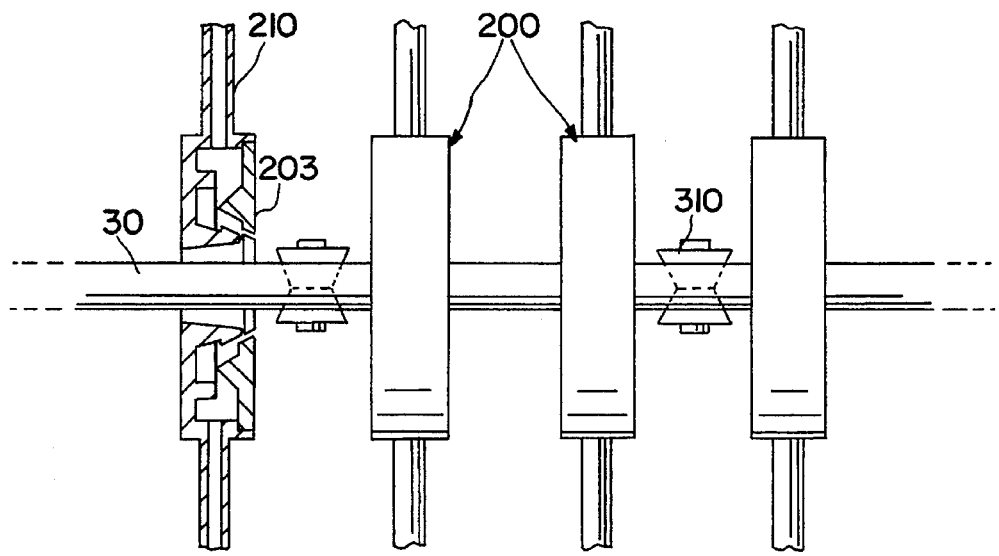
FIG. 6 is a plan examplary view of one-side section of the cooling portion in accordance with the present invention.
Figure 7:
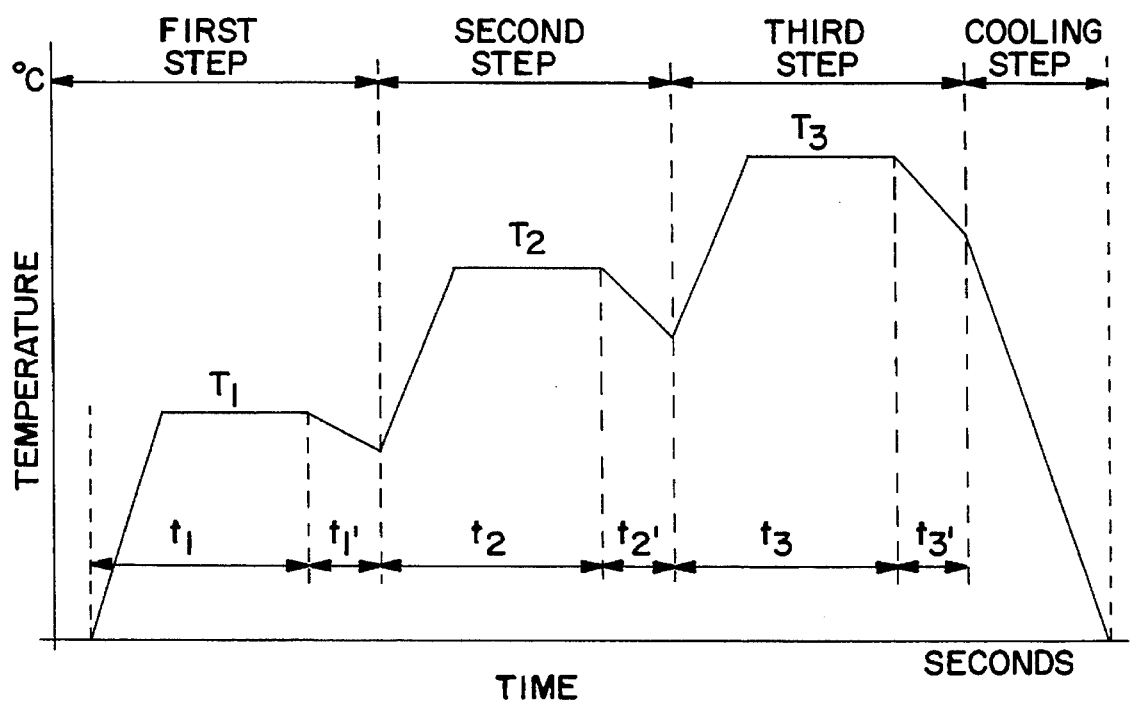
FIG. 7 is a graph showing working conditions of heat treatment in accordance with the present invention.

FIG. 1 is the steps in the manufacture of the present invention, the overall flow chart of the steps from selection of a material and heat treatment to surface treatment of a product. FIG. 2 is a heat treatment device for manufacturing an impact beam of the present invention. FIGS. 3 and 4 are a perspective view and a sectional view of a ring-shaped nozzle water cooling tube in accordance with the present invention. FIG. 5 is a oneside sectional view of a cooling portion. FIG. 6 is a plan view of a partial section of a cooling portion having a ring-shaped nozzle water cooling tube in accordance with the present invention. FIG. 7 is a graph showing working conditions of a heat treatment in accordance with the present invention.

As shown in FIG. 2, a heat treatment device of the present invention includes a plurality of transfer rollers 310 for transferring an impact beam 30; a heat treatment portion 10 having first to third high frequency induction heating devices 101, 102 and 103 with each space being of a predetermined width to heat the impact beam 30 transferred by the transfer rollers 310; and a cooling portion 20 having a plurality of ring-shaped nozzle water cooling tubes 200 for cooling the impact beam after heat treatment and air cooling.

Each of the high frequency induction heating devices 101, 102 and 103 is a small box-shaped device of uniform temperature dispersion and is adjustable in temperature. These devices have a structure to enable a high frequency electric heat line to be wound on a tube-shaped ceramic and are connected to a temperature control device (not illustrated) to control the temperature of a furnace.

The cooling portion 20 has a plurality of ring-shaped nozzle water cooling tubes 200 and is suspendedly fixed by a bracket 220, as shown in FIG. 5.

An outer circumferential portion 202 of the water cooling tube 200 is provided with more than one coolant supply tube 210 to provide coolant as shown in FIGS. 3 and 4. On the sectional portion of an inner circumferential portion 201, an injection hole 203 spraying coolant is cut out to be ring shaped.

A space portion 204 is formed between the outer and inner circumferential portions 202 and 201 to pass the coolant.

A projection jaw 205 is integrally formed in one side portion of the water cooling tube 200 and a slant protruding portion 206 is formed on the opposite side lower portion inside the space portion 204 with an angle of about 150°.

The ring-shaped nozzle water cooling tubes 200 are supplied with the coolant from the coolant supply tube 210 and the coolant passes through the projection jaw 205 and slant protruding portion 206 of the space portion 204 to maintain the pressure of the coolant constantly.

The coolant having the constant pressure is injected with a constant pressure to the outer circumferential portion of the impact beam 30 via the injection hole 203 to have an even cooling effect.

The slant protruding portion 206 may be formed by an injection angle and injection pressure of a nozzle. The injection angle of nozzle is changeable depending on the conditions of heat treatment.

More specifically, a welded tube is formed by slitting, roll forming, and high frequency induction (HFI) welding the hot rolled steel sheets having the present inventive composition, and is cut to make the impact beam 30, according to the steps of FIG. 1.

The cut impact beam 30 is put on the transfer rollers 310 of the entrance side to be transferred to the first high frequency induction heating device 101 automatically, as shown in FIG. 2.

The impact beam 30 is heated for 0.83 to 2.5 seconds at 500° to 720° C. in the device 101 and air-cooled for 0.27 to 1 second out of the first high frequency induction heating device 101. After that, the impact beam is transferred to the second high frequency induction heating device 102 and heated for 0.83 to 2.5 seconds at 750° to 850° C.

Out of the second high frequency induction heating device 102, the impact beam 30 is air cooled for 0.27 to 1 second and transferred to the 3rd high frequency induction heating device 103.

The impact beam 30 is heated for 0.83 to 2.5 seconds at 830° to 960° C. in the third high frequency induction heating device 103, and is then air cooled for 1.5 to 5 seconds.

The impact beam 30 passes the coolant injected from the ring-shaped nozzle water cooling tubes 200 of the cooling portion 20 and is quenched as shown in FIG. 6.

The present inventive impact beam of an automotive vehicle door is made by the sequential heating, air cooling and water cooling.

The present invention is utilized to make such an impact beam having a good material characteristics such as a high tensile strength and a high toughness, and can make an impact beam economically by providing simple and serial automotive procedure without tempering process.

A preferred embodiment on the heat treatment of the present invention is now described.

First, comparative examples having a chemical composition, as shown in Table 1 and rolled steel sheets of the present invention are prepared.

TABLE 1

|        | 1      | 2      | 3      | 4      | 5      | 6      | 7      |
|--------|--------|--------|--------|--------|--------|--------|--------|
| C      | 0.193  | 0.177  | 0.161  | 0.155  | 0.150  | 0.2    | 0.2    |
| Mn     | 1.47   | 1.49   | 1.49   | 1.48   | 1.98   | 1.19   | 1.18   |
| Si     | 0.209  | 0.216  | —      | —      | 0.203  | 0.34   | 0.39   |
| P      | 0.002  | 0.002  | 0.002  | 0.002  | 0.002  | 0.016  | 0.02   |
| S      | 0.005  | 0.004  | 0.005  | 0.005  | 0.004  | 0.003  | 0.004  |
| Sol—Al | 0.035  | 0.041  | 0.13   | 0.2    | 0.042  | 0.025  | 0.024  |
| B      | 0.0029 | 0.003  | 0.0044 | 0.0033 | —      | 0.0015 | 0.0015 |
| Cr     | 0.201  | 0.157  | —      | —      | —      | 0.21   | 0.18   |
| Ti     | 0.023  | 0.024  | 0.024  | —      | —      | 0.025  | 0.027  |
| Nb     | —      | 0.016  | —      | —      | —      | —      | —      |
| N      |        |        |        |        |        | 0.0025 | 0.0056 |

Note
Comparative material
Present Invention

By molding and high frequency weld-cutting seven steel sheets, tube-shaped impact beam samples are made, and heat-treated under the condition of Table 2. Samples of numbers 1, 2, 6 and 7 are heat treated under the conditions of the present invention and samples of numbers 3, 4 and 5 are heat-treated under comparative conditions.

TABLE 2

| Sample No | 1st Step | | | 2nd Step | | | 3rd Step | | | |
|---|---|---|---|---|---|---|---|---|---|---|
| | $T_1$ (°C.) | $t_1$ sec | $t_1'$ sec | $T_2$ (°C.) | $t_2$ sec | $t_2'$ sec | $T_3$ (°C.) | $t_3$ sec | $t_3'$ sec | |
| 1 | 650 | 1.67 | 0.56 | 808 | 1.67 | 0.56 | 895 | 1.67 | 2.39 | Present |
| 2 | 670 | 1.67 | 0.56 | 816 | 1.67 | 0.56 | 910 | 1.67 | 2.39 | Invention Method |
| 3 | 722 | 2.5 | 0.83 | 851 | 2.5 | 0.83 | 961 | 2.5 | 3.58 | Compara- |
| 4 | 728 | 2.5 | 0.83 | 857 | 2.5 | 0.83 | 965 | 2.5 | 3.58 | tive |
| 5 | 724 | 2.5 | 0.83 | 854 | 2.5 | 0.83 | 963 | 2.5 | 3.58 | Method |
| 6 | 650 | 1.67 | 0.56 | 808 | 1.67 | 0.56 | 895 | 1.67 | 2.39 | Present |
| 7 | 670 | 1.67 | 0.56 | 816 | 1.67 | 0.56 | 910 | 1.67 | 2.39 | Invention Method |

The mechanical properties of the impact beam heat treated under the conditions of Table 2 are shown in Table 3.

TABLE 3

| Sample No. | Tensile strength (kg/mm$^2$) | Yield strength (kg/mm$^2$) | Elongation (%) | Remark |
|---|---|---|---|---|
| 1 | 148.0 | 112.4 | 8.0 | Comparative |
| 2 | 140.2 | 106.8 | 8.1 | Examples |
| 3 | 136.7 | 100.5 | 7.5 | |
| 4 | 131.6 | 91.8 | 7.9 | |
| 5 | 135.0 | 95.6 | 7.8 | |
| 6 | 179.0 | 145.6 | 10.2 | Present |
| 7 | 177.3 | 138.3 | 9.5 | Invention |

The bending characteristics of an impact beam (sample No. 6) made according to the present invention are tested by a thickness and an angle of welding line, and the test results are shown in Table 4.

TABLE 4

| Thickness | Test direction with welding line | Energy load (tf) | | | displacement (mm) | | Stress (Kgf/mm$^2$) | | Remark |
|---|---|---|---|---|---|---|---|---|---|
| | | (tfmm) | max | break | max | break | max | break | |
| 2.0 t | 0° | 250.12 | 2.158 | 0.92 | 78.57 | 148.91 | 246.53 | 105.10 | SPAN = 600 |
| | 90° | 248.42 | 2.153 | 0.882 | 77.13 | 149.01 | 245.96 | 100.76 | |
| | 0° | 196.59 | 1.567 | 1.348 | 104.77 | 149.98 | 238.69 | 205.33 | SPAN = 800 |
| | 90° | 192.16 | 1.542 | 1.375 | 100.77 | 149.99 | 234.88 | 209.44 | |

TABLE 4-continued

| Thickness | Test direction with welding line | Energy load (tf) | | | displacement (mm) | | Stress (Kgf/mm²) | | Remark |
|---|---|---|---|---|---|---|---|---|---|
| | | (tfmm) | max | break | max | break | max | break | |
| 2.2 t | 0° | 282.02 | 2.355 | 1.02 | 72.12 | 149.77 | 249.29 | 107.97 | SPAN = 600 |
| | 90° | 286.46 | 2.384 | 1.138 | 81.8 | 149.33 | 252.36 | 120.47 | |
| | 0° | 203.57 | 1.636 | 1.466 | 94.43 | 150 | 230.91 | 206.92 | SPAN = 800 |
| | 90° | 204.97 | 1.644 | 1.491 | 97.93 | 149.98 | 232.04 | 210.44 | |
| 2.4 t | 0° | 312.88 | 2.573 | 1.269 | 78.62 | 149.98 | 254.58 | 125.56 | SPAN = 600 |
| | 90° | 309.26 | 2.526 | 1.289 | 79.75 | 150.02 | 249.93 | 127.54 | |
| | 0° | 236.36 | 1.864 | 1.744 | 92.39 | 150.06 | 245.91 | 230.08 | SPAN = 800 |
| | 90° | 233.53 | 1.86 | 1.746 | 96.73 | 150.05 | 245.38 | 230.34 | |

The impact beam treated according to the present invention exhibits more than 170 kg/mm² tensile strength, more than 130 kg/mm² yield strength, and more than 8% elongation, and its bending test results are excellent, and it can be lightweight. While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of appended claims.

What is claimed is:

1. A method for heat treating an impact beam of an automotive vehicle door exhibiting high tensile strength, yield strength and elongation, comprising the steps of:

preparing hot rolled steel sheets consisting essentially of 0.18 % to 0.22% carbon; 1.0 to 1.5% manganese; 0.15 to 0.4% silicon; not more than 0.025% phosphorous; not more than 0.008% nitrogen; not more than 0.0010% sulfur; 0.01 to 0.04% aluminum; 0.001 to 0.003% boron; 0.1 to 0.3% chromium; 0.01 to 0.035% titanium; and the balance essentially consisting of iron;

roll-forming and welding the steel sheets to make a tube-shaped impact beam;

carrying out a heat treatment including three steps of high frequency induction heating and air cooling the impact beam consecutively; and carrying out quenching of water cooling said heat treated and air cooled impact beam;

wherein said heat treatment step includes the steps of:

first high frequency induction heating said impact beam for 0.83 to 2.5 seconds at 500° to 720° C. and air cooling said beam for 0.27 to 1 second;

second high frequency induction heating said impact beam first heat treated for 0.83 to 2.5 seconds at 750° to 850° C. and air cooling said beam for 0.27 to 2 seconds; and third high frequency induction heating said impact beam second heat-treated for 0.83 to 2.5 seconds at 830° to 960° C. and air cooling said beam for 1.5 to 5 seconds.

2. The method as set forth in claim 1, wherein said water cooling is carried out by a coolant injection technique using a ring-shaped nozzle water cooling tube.

* * * * *